(12) United States Patent
Beichl et al.

(10) Patent No.: US 7,909,334 B2
(45) Date of Patent: Mar. 22, 2011

(54) SEALING ARRANGEMENT AND METHOD FOR THE PRODUCTION THEREOF

(75) Inventors: Stefan Beichl, Herrsching (DE); Christoph Cernay, Bruckmuehl (DE); Alfons Gail, Friedberg (DE); Erhan Ücgül, Berlin (DE)

(73) Assignee: MTU Aero Engines GmbH, Munich (DE)

( * ) Notice: Subject to any disclaimer, the term of this patent is extended or adjusted under 35 U.S.C. 154(b) by 612 days.

(21) Appl. No.: 10/888,637

(22) Filed: Jul. 9, 2004

(65) Prior Publication Data
US 2005/0006968 A1   Jan. 13, 2005

(30) Foreign Application Priority Data
Jul. 12, 2003  (DE) .................................. 103 31 601

(51) Int. Cl.
*F01D 11/02* (2006.01)
(52) U.S. Cl. ....................................................... 277/355
(58) Field of Classification Search .................. 277/355, 277/421, 415
See application file for complete search history.

(56) References Cited

U.S. PATENT DOCUMENTS

| | | | | |
|---|---|---|---|---|
| 5,181,728 A | * | 1/1993 | Stec | 277/355 |
| 5,425,543 A | * | 6/1995 | Buckshaw et al. | 277/350 |
| 5,630,590 A | * | 5/1997 | Bouchard et al. | 277/301 |
| 5,688,105 A | * | 11/1997 | Hoffelner | 415/170.1 |
| 5,704,760 A | | 1/1998 | Bouchard et al. | 415/170.1 |
| 6,077,038 A | * | 6/2000 | Gail et al. | 415/229 |
| 6,226,975 B1 | * | 5/2001 | Ingistov | 60/772 |
| 6,293,553 B1 | * | 9/2001 | Werner et al. | 277/355 |
| 6,382,632 B1 | * | 5/2002 | Chupp et al. | 277/355 |
| 6,550,777 B2 | * | 4/2003 | Turnquist et al. | 277/355 |
| 6,808,179 B1 | * | 10/2004 | Bhattacharyya et al. | 277/348 |
| 6,913,265 B2 | * | 7/2005 | Datta | 277/355 |
| 2002/0020968 A1 | * | 2/2002 | Gail et al. | 277/355 |
| 2004/0000761 A1 | * | 1/2004 | Addis | 277/355 |
| 2005/0116423 A1 | * | 6/2005 | Beichl et al. | 277/355 |

FOREIGN PATENT DOCUMENTS

DE  10018273  10/2001
WO  9853230  11/1998

* cited by examiner

Primary Examiner — Shane Bomar
Assistant Examiner — Gilbert Y Lee
(74) Attorney, Agent, or Firm — Davidson, Davidson & Kappel, LLC

(57) ABSTRACT

A sealing arrangement for a non-hermetic seal between a stator and a rotor includes a brush gasket having a plurality of bristles wound around a core element and affixed to the core element with a clamping element. The brush gasket is disposed at least partially in a receiving space delimited by a support element and by a cover element. The support element, the cover element, and the brush gasket are secured using at least one fitting element in at least one recess, especially in an axial groove or bore, in the stator. In addition to being positioned by using the at least one fitting element, the components may also be affixed to the stator using an attachment element.

7 Claims, 3 Drawing Sheets

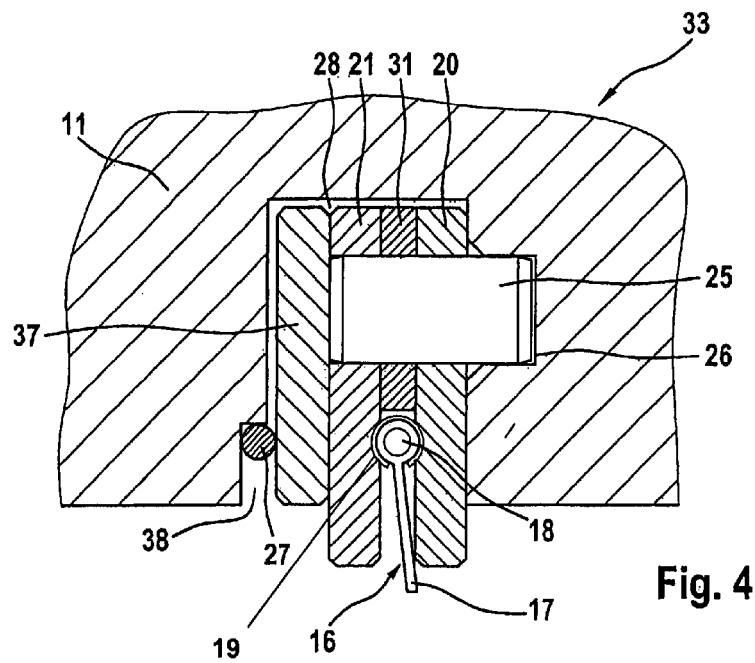
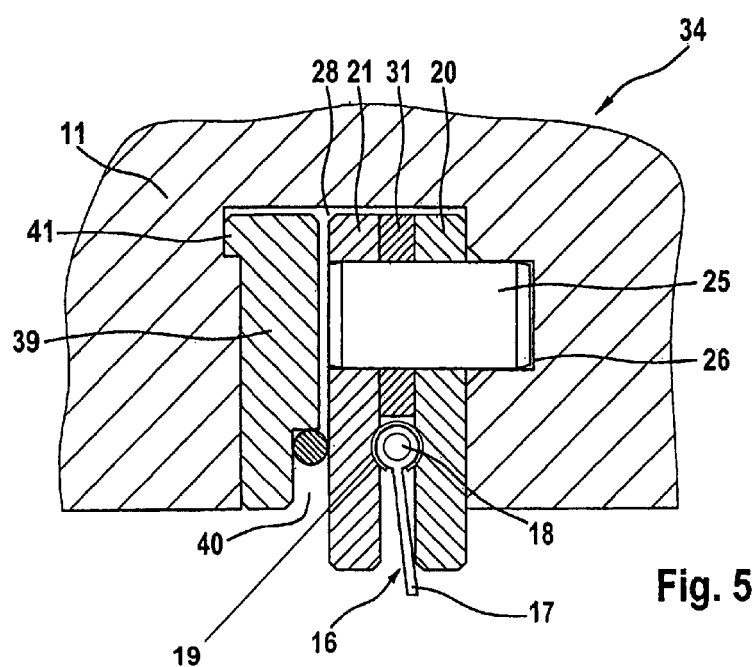

SEALING ARRANGEMENT AND METHOD FOR THE PRODUCTION THEREOF

Priority is claimed to German Patent Application No. DE 103 31 601.9, filed on Jul. 12, 2003, the entire disclosure of which is incorporated by reference herein.

The present invention relates to a sealing arrangement for a non-hermetic seal between a stator and a rotor. Moreover, the present invention relates to a method for the production of such a sealing arrangement.

BACKGROUND

In turbo machines, especially in gas turbines such as airplane thrusters, there are a number of application cases in which two parts that are rotating relative to each other, namely, a stator and a rotor of the turbo machine, have to be sealed against a gas stream that is passing through the turbo machine. Such an application case is, for instance, the sealing of a gap that is formed between the fixed guide blades belonging to the stator and the rotor of an airplane thruster.

Brush gaskets are known from the state of the art for purposes of sealing annular interstices between components that rotate relative to each other. World patent document WO 98/53230 and German application DE 100 18 273 A1, both of which are incorporated by reference herein, describe such brush gaskets.

In the case of the brush gaskets known from the abovementioned state of the art, the brush gasket is comprised of several wire-like bristles that are wound around a core and affixed to said core by means of a clamping ring. According to the state of the art, the unit consisting of the clamping ring, the core and the bristles, which forms the actual brush gasket, is positioned in a receiving space that is delimited by a support ring and a cover ring.

SUMMARY OF THE INVENTION

Before this backdrop, the present invention is based on the objective of creating a novel sealing arrangement and a method for the production of such a sealing arrangement.

The present invention provides a sealing arrangement for a non-hermetic seal between a stator (11) and a rotor (12), especially between a fixed housing and a rotor of a turbo machine, comprising a brush gasket (16) whereby the brush gasket has several bristles (17) that are wound around a core element (18) and affixed to said core element by means of a clamping element (19) and whereby the brush gasket is arranged at least partially in a receiving space (22) that is delimited by a support element (20) and by a cover element (21), characterized in that the support element (20) and the cover element (21), together with the brush gasket (16) positioned between the support element and the cover element, are secured by means of at least one fitting element (25) in at least one recess (26) in the stator (11).

According to the present invention, the support element and the cover element, together with the brush gasket positioned between the support element and the cover element, are secured by means of at least one fitting element in at least one recess, preferably in a groove or bore that runs axially in the stator.

According to an advantageous refinement of the present invention, in addition to the positioning of the support element, the cover element and the brush gasket by means of the fitting element, these components are affixed to the stator by means of an attachment element. The attachment element is arranged in a recess—a groove or a bore—that runs essentially in the circumferential direction preferably in the stator, whereby this recess runs adjacent to the cover element and whereby the attachment element preferably lies directly against the stator and directly against the cover element or else is in contact with these. If there is a distance element positioned between the stator and the cover element, the attachment element is in contact either directly with the stator and, via an inserted distance element, with the cover element, or else directly with the cover element and, via an inserted distance element, with the stator.

Preferably, at least one spacing element is positioned between the support element and the cover element, whereby the brush gasket is arranged adjacent to the spacing element, likewise between the support element and the cover element. The or each recess running axially in the stator is arranged adjacent to the support element, whereby the or each fitting element extends through the support element, the cover element and the or each spacing element and whereby the or each fitting element projects with one end into the appertaining axial recess.

In addition, the present invention provides A method for the production of sealing arrangements for a non-hermetic seal between a stator (11) and a rotor (12), comprising a brush gasket (16), whereby the brush gasket has several bristles (17) that are wound around a core element (18) and affixed to said core element by means of a clamping element (19), and whereby the brush gasket (16) is arranged at least partially in a receiving space (22) that is delimited by a support element (20) and by a cover element (21), characterized in that the support element and the cover element, together with the brush gasket positioned between the support element and the cover element, are secured in a recess (28) in the stator and are positioned in at least one recess (26) in the stator, especially in an axial groove or bore, by means of at least one fitting element (25).

Preferred embodiments of the present invention ensue from the claims and from the description that follows.

BRIEF DESCRIPTION OF THE DRAWINGS

Examples of embodiments of the present invention—without being limited to these—are elaborated upon with reference to the drawings, in which:

FIG. 4 shows a schematic cross section of a brush gasket according to the present invention in a fourth embodiment of the present invention; and FIG. 5 shows a schematic cross section of a brush gasket according to the present invention in a fifth embodiment of the present invention.

DETAILED DESCRIPTION

Figure 1:
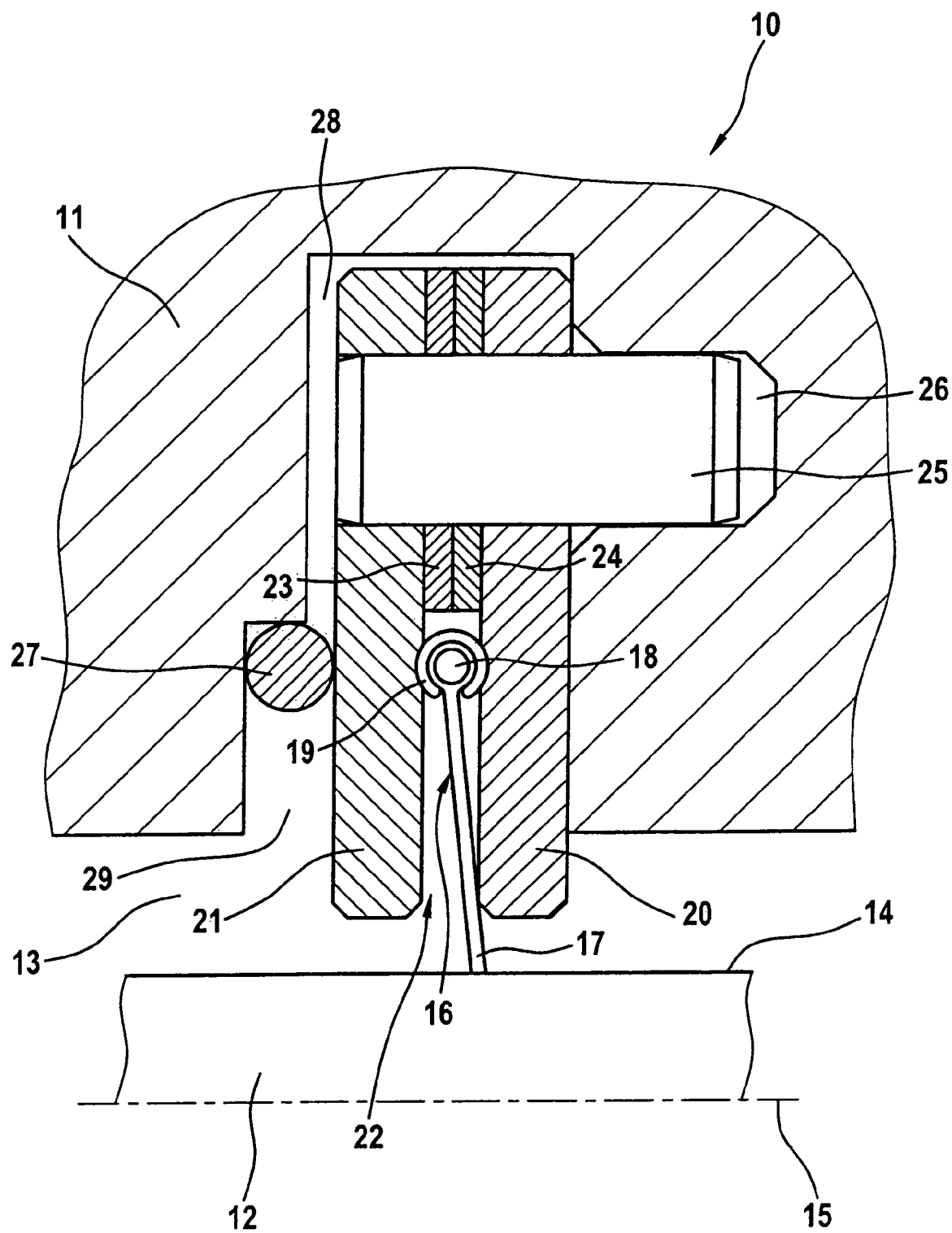
FIG. 1 shows a schematic cross section of a brush gasket according to the present invention in a first embodiment of the present invention.

FIG. 1 shows a sealing arrangement 10 according to a first embodiment of the present invention. The sealing arrangement 10 according to FIG. 1 serves to provide a non-hermetic seal between a stator 11 and a rotor 12. The stator 11 in the depicted embodiment is a fixed housing of a gas turbine. The rotor 12 extends through a bore 13 in the stator 11. A surface of the rotor 12 is designated with the reference numeral 14 and a longitudinal axis of the rotor 12 with the reference numeral 15.

The sealing function of the sealing arrangement 10 shown in FIG. 1 is provided by a brush gasket 16. The brush gasket 16 comprises several bristles 17 that are wound around a core element 18. The core element 18 is preferably configured as a core wire. The bristles 17 wound around the core element 18 are affixed on the core element 18 by means of a clamping element 19. According to FIG. 1, the cross section of the clamping element 19 has the shape of an open ring or of a so-called C-tube. The free ends of the bristles 17 of the brush gasket 16 lie against the surface 14 of the rotor 12.

Aside from the brush gasket 16, the sealing arrangement 10 also comprises a support element 20 and a cover element 21. The support element 20 as well as the cover element 21 have a plate-like design. If a differential pressure is present on the brush gasket 16 or on the sealing arrangement 10, then the cover element 21 or the cover plate is arranged on the high-pressure side and the support element 20 or the support plate is arranged on the low-pressure side. As can be seen in FIG. 1, the bristles 17 of the brush gasket 16 lie against at least part of the support element 20.

The support element 20 as well as the cover element 21 delimit a receiving space 22. The brush gasket 16 is arranged inside the receiving space 22.

According to FIG. 1, two spacing elements 23 and 24 are arranged between the support element 20 and the cover element 21 for purposes of creating the receiving space 22. The spacing elements 23 and 24 extend on the radial outer end and thus on the end of the support element 20 and cover element 21 facing away from the rotor 12 between said elements and they leave a receiving space 22 free between the support element 20 and the cover element 21 on the radial inner end or on the end facing the rotor 12. The brush gasket 16 is arranged in this receiving space 22, whereby the free ends 17 of the brush gasket protrude out of the receiving space 22 and, as already mentioned, touch the surface 14 of the rotor 12.

It is a feature of the present invention that the unit consisting of the support element 20, the cover element 21, the brush gasket 16 and the spacing elements 23 and 24 is positioned in the stator 11 by means of at least one fitting element 25. According to FIG. 1, the depicted fitting element 25 penetrates the support element 20, the cover element 21 as well as the two spacing elements 23 and 24. For this purpose, appropriate bores have been made in the support element 20, in the cover element 21 as well as in the spacing element elements 23 and 24. With one of its free ends, the depicted fitting element 25 protrudes into a recess 26—configured as a groove in the embodiment shown here—that runs axially in the stator 11. The axial recess 26 in the stator 11 is situated adjacent to the support element 20. Accordingly, the brush gasket 16 is positioned relative to a corresponding axial recess 26 by means of the fitting element 25. The precise positioning of the fitting element 25 or of the recess 26 relative to the surface 14 of the rotor 11 and thus relative to the running surface of the bristles 17 of the brush gasket 16 ensures the uniformity of the running gap of the sealing arrangement 10.

At this juncture, it should be pointed out that the support element 20, the cover element 21, the spacing elements 23 and 24 as well as the brush gasket 16 are ring-shaped. Accordingly, several fitting elements 25 can be provided along the circumference of the sealing arrangement 10 and said fitting elements engage with matching recesses 26 that run in the axial direction.

In order to radially affix the brush gasket 16 between the support element 20 and the cover element 21, the clamping element 19 of the brush gasket 16 engages with recesses provided on the inside of the support element 20 as well as of the cover element 21. This is illustrated in the depiction according to FIG. 1 in that the clamping element 19 protrudes into the area of the support element 20 as well as of the cover element 21. This attachment can also be achieved by means of stud screws, by welding, soldering or gluing.

It is likewise a feature of the present invention that, in addition to the fact that the support element 20, the cover element 21, the brush gasket 16 as well as the spacing elements 23 and 24 are positioned by means of the fitting elements 25, these components are also affixed to the stator 11 by means of an attachment element 27. As can be seen in FIG. 1, the unit consisting of the support element 20, the cover element 21, the spacing elements 23 and 24 as well as the brush gasket 16 is arranged in a radial recess 28 in the stator 11. As already mentioned above, these components are positioned relative to the rotor 12 by means of the fitting element 25 or each fitting element 25 that engages with the axial recesses 26 of the stator 11. The additional attachment element 27, however, serves to affix these components in this position. In the embodiment according to FIG. 1, the attachment element 27 lies directly against the stator 11 on the one hand, and directly against the cover element 21 on the other hand. For this purpose, in a section across from the rotor 12, the recess 28 in the stator 11 is widened by a groove 29 that, like the recess 28, runs radially or in the circumferential direction. The attachment element 27 engages with this groove 29, coming to lie directly against the stator 11 on the one hand, and directly against the cover element 21 on the other hand. Accordingly, the attachment 27 is clamped into the groove 29 in this manner and it affixes the brush gasket 16 in its position relative to the rotor 12.

As already mentioned above, the support element 20, the cover element 21, the spacing elements 23 and 24 as well as the brush gasket 16 are ring-shaped. These components can be configured either as an encircling closed ring or else in segments, consisting of several ring segments. Preferably, several fitting elements 25 are arranged along the circumference of the sealing arrangement 10. The attachment element 27 likewise extends along the entire circumference of the sealing arrangement 10. The fitting element 25 or each fitting element 25 is preferably configured as a location pin or a close-tolerance bolt. The attachment element 27 is preferably configured as a caulking wire or as clamping claws.

Figure 2:
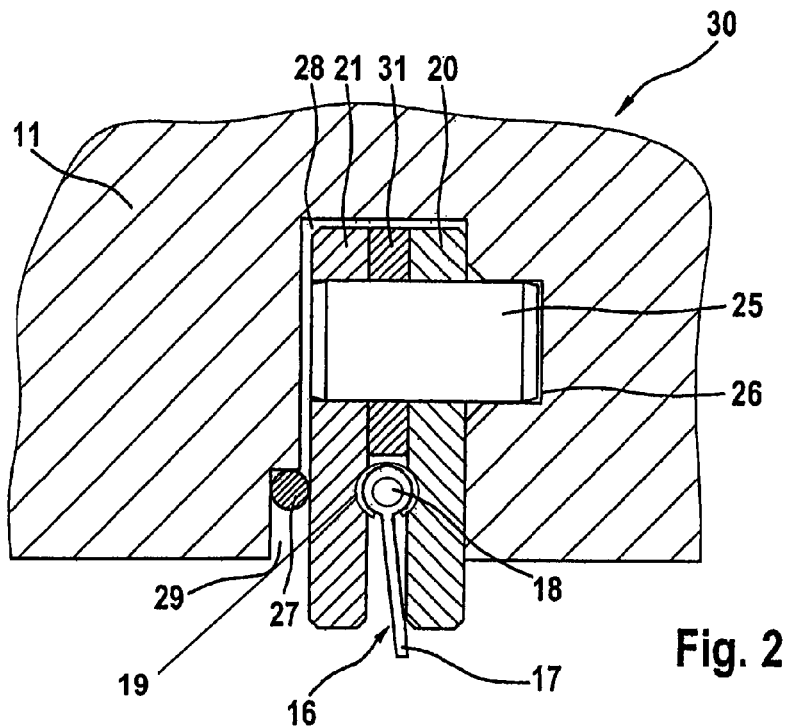
FIG. 2 shows a schematic cross section of a brush gasket according to the present invention in a second embodiment of the present invention.

FIG. 2 shows another embodiment of a sealing arrangement 30 according to the present invention. The depiction of the rotor was dispensed with in the illustration of the sealing arrangement 30 according to FIG. 2. This also applies to the sealing arrangements according to FIGS. 3 through 5. The sealing arrangement 30 of the embodiment according to FIG. 2 corresponds essentially to the sealing arrangement 10 of the embodiment according to FIG. 1. In order to avoid repetitions, the same reference numerals were employed for the same components. The embodiment according to FIG. 2 differs from the embodiment according to FIG. 1 merely in that there is only one spacing element 31 arranged between the support element 20 and the cover element 21 and not two spacing elements 23 and 24 as in the embodiment according to FIG. 1. Regarding the rest of the set-up and mode of function of the sealing arrangement 30, there are no differences from the first embodiment according to FIG. 1. Thus, reference is hereby made to the elaborations above.

Figure 3:
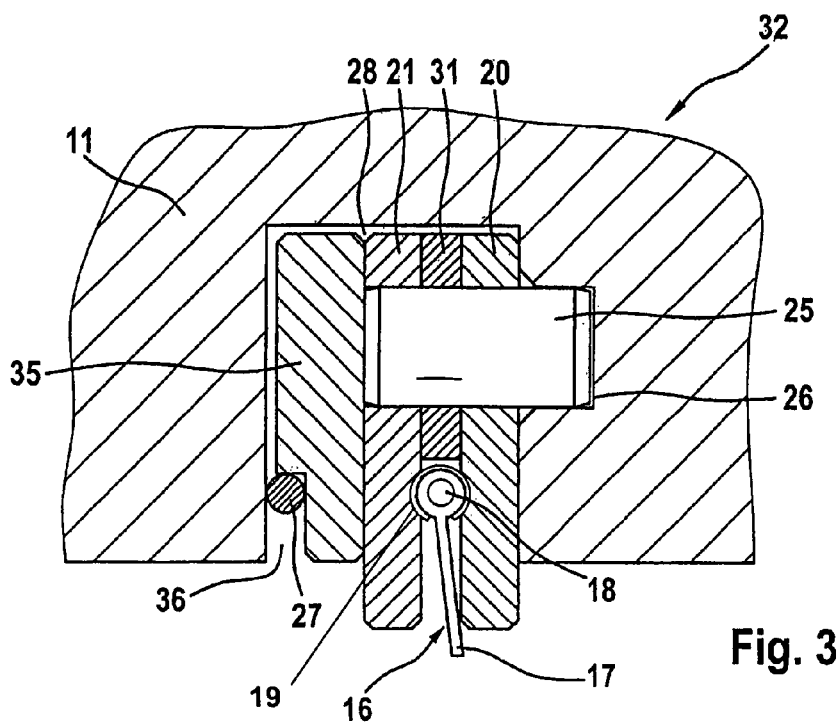
FIG. 3 shows a schematic cross section of a brush gasket according to the present invention in a third embodiment of the present invention.

FIGS. 3, 4 and 5 show additional embodiments of sealing arrangements 32, 33 and 34 according to the present invention. Also in the case of these embodiments, for the sake of avoiding repetitions, the same components were designated with the same reference numerals. The embodiments according to FIGS. 3 to 5 differ from the embodiments according to FIGS. 1 and 2 in that an additional component has been inserted into the recess 28 of the stator 11. The component in this case is a distance element.

Thus, in the embodiment according to FIG. 3, the recess 28 in the stator 11 has been widened in such a way that, aside from the support element 20, the cover element 21 and the spacing element 31, it is also possible to position a distance element 35 in the recess 28. The distance element 35 has a notch or a groove 36 in a lower section facing the rotor 12. The attachment element 27 is placed into this groove 36. Hence, in the embodiment according to FIG. 3, the attachment element 27 lies, on the one hand, directly against the stator 11 but not, as in the embodiment of FIGS. 1 and 2, against the cover element 21. Instead, the attachment element 27 in the embodiment of FIG. 3 lies against the distance element 35 and is consequently in contact with the cover element 21 via an inserted distance element 35. In this manner as well, the brush gasket 16 can be securely affixed relative to the rotor. The widening of the recess 28 translates into easier assembly or positioning of the unit consisting of the support element 20, the cover element 21, the brush gasket 16 and the spacing element 31 in the stator 11.

The sealing arrangement 33 of the embodiment according to FIG. 4 corresponds essentially to the sealing arrangement 32 of the embodiment according to FIG. 3. Also with this embodiment of the present invention, the recess 28 of the stator 11 is widened and a distance element 37 is provided. In contrast to the embodiment according to FIG. 3, a radial groove 38 that serves to receive the attachment element 27 is not made in the distance element 37 but rather in the stator 11. For the rest, in terms of the set-up and mode of function of the sealing arrangement 33, there are no differences from the sealing arrangement 32 of FIG. 3. Accordingly, also in the case of the embodiment of FIG. 4, the attachment element 27 lies directly against the stator 11 and is in contact with the cover element 21 via an inserted distance element 37.

FIG. 5 shows another embodiment of a sealing arrangement 34 according to the present invention. For instance, also with the sealing arrangement 34 according to FIG. 5, a distance element 39 is provided that is placed into a widened recess 28 of the stator 11. The embodiment according to FIG. 5 corresponds essentially to the embodiment according to FIG. 3. A first difference lies in the fact that a groove 40 that serves to receive the attachment element 27 is made in the distance element 39 on the side facing the cover element 21 and not, as in the embodiment according to FIG. 3, on the side facing away from the cover element 21. Accordingly, in the embodiment according to FIG. 5, the attachment element 27 lies directly against the cover element 21 and is in contact with the stator 11 via an inserted distance element 39. This, however, makes no difference whatsoever for the principle and mode of action of the sealing arrangement according to the present invention. A second difference between the sealing arrangement 34 according to FIG. 5 and the sealing arrangement 32 according to FIG. 3 lies in the fact that the distance element 39 has a projection 41 on the radial outer end. This projection 41 engages with another recess inside the stator 11. As a result, the position of the distance element 39 in the stator 11 can be additionally secured.

All of the embodiments according to the present invention shown in FIGS. 1 through 5 are based on the same principle. Thus, in all of the embodiments, the unit consisting of the support element 20, the cover element 21, the spacing elements and the brush gasket 16 is positioned in the stator 11 by means of the fitting elements 25. These fitting elements 25 are preferably configured as location pins or close-tolerance bolts which engage with corresponding axial recesses 26 in the stator 11. Furthermore, all of the embodiments have in common the fact that the attachment in the stator 11 is achieved by means of an attachment element 27 that is preferably configured as a caulking wire.

The design principle of the sealing arrangement according to the present invention as described above stands out for a simple set-up and thus a simple design. Running gaps of the sealing arrangements can be kept at small tolerances. The brush gasket 16 can be affixed inside the stator 11 employing simple means.

Even though the principle of the sealing arrangement according to the present invention as described above can be used for all brush gaskets, the present invention can be employed particularly advantageously whenever there is a need for brush gaskets having large diameters. For instance, according to the state of the art, the cover element 21 or a corresponding cover ring as well as the support element 20 or a corresponding support ring can be manufactured by means of lathing or deep-drawing. With large diameters, however, it is very difficult to keep within the requisite tolerances when cover rings or support rings are lathed. Deep-drawing ceases to be economically feasible due to the large tools needed for the large diameters. For this reason, according to the present invention, in order to manufacture the brush gaskets according to the present invention, the support element 20, the cover element 21, the or each spacing element as well as the brush gaskets are made of straight sections that can then be curved to the desired radius. Such sections can be, for example, sheet-metal strips or rings cut out of a sheet-metal plate. The sections, which have been curved to the desired radius, are then employed for the production of the sealing arrangement according to the present invention as described above in detail.

This entails the advantage that no limitations exist in terms of the size of the diameter of the sealing arrangements. Furthermore, the sealing arrangements can be produced cost effectively. Moreover, a weight reduction is achieved for the sealing arrangement in comparison to lathed components.

It should still be pointed out that a so-called hook brush gasket can also be employed in the sealing arrangements according to the present invention.

What is claimed is:
1. A sealing arrangement for a non-hermetic seal between a stator and a rotor defining an axis, the sealing arrangement comprising:
   a support element;
   a cover element, wherein the cover element and the support element define a receiving space therebetween, the support element and the cover element being configured in an opening formed in the stator adjacent to the rotor, such that the support element is adjacent to a first stator wall defining the opening and the cover element is adjacent to a second stator wall defining the opening;
   a core element;
   a brush gasket disposed at least partially in the receiving space and having a plurality of bristles wound around the core element;
   a clamping element configured to affix the plurality of bristles to the core element;
   at least one fitting element disposed in a recess in the first stator wall, the at least one fitting element securing the support element, the cover element, and the brush gasket to each other and to the stator and passing through the support element and cover element; and at least one spacing element disposed between the support element and the cover element and wherein the brush gasket is disposed adjacent to the at least one spacing element and between the cover element and the support element.

2. A sealing arrangement for a non-hermetic seal between a stator and a rotor defining an axis, the sealing arrangement comprising:
 a support element;
 a cover element, wherein the cover element and the support element define a receiving space therebetween;
 a core element;
 a brush gasket disposed at least partially in the receiving space and having a plurality of bristles wound around the core element;
 a clamping element configured to affix the plurality of bristles to the core element; and
 at least one fitting element disposed in a recess in the stator, the at least one fitting element securing the support element, the cover element, and the brush gasket to each other and to the stator and passing through the support element and cover element; and
 at least one attachment element configured to, together with the at least one fitting element, secure the position of the support element, the cover element and the brush gasket by forcing the cover element away from a wall of the stator.

3. The sealing arrangement as recited in claim 2, further comprising a circumferential groove running adjacent to the cover element, wherein the at least one attachment element is disposed in the circumferential groove and in contact with the stator and the cover element.

4. The sealing arrangement as recited in claim 2, further comprising a distance element disposed between the stator and the cover element, wherein the attachment element contacts the distance element and one of the stator and the cover element.

5. The sealing arrangement as recited in claim 4, wherein the attachment element is configured as a wire-shaped caulking element.

6. The sealing arrangement as recited in claim 5, wherein the attachment element includes a caulking wire.

7. A sealing arrangement for a non-hermetic seal between a stator and a rotor defining an axis, the sealing arrangement comprising:
 a support element;
 a cover element, wherein the cover element and the support element define a receiving space therebetween;
 a core element;
 a brush gasket disposed at least partially in the receiving space and having a plurality of bristles wound around the core element;
 a clamping element configured to affix the plurality of bristles to the core element;
 at least one fitting element disposed in a recess in the stator, the at least one fitting element securing a position of the support element, the cover element, and the brush gasket; and
 at least one spacing element disposed between the support element and the cover element, wherein the brush gasket is disposed adjacent to the at least one spacing element and between the cover element and the support element;
 wherein the recess in the stator runs axially and adjacent to the support element and wherein the at least one fitting element includes a first end projecting into the recess and wherein the fitting element extends through the support element, the cover element and the at least one spacing element.

* * * * *